US009933887B2

(12) United States Patent
    Choi (10) Patent No.: US 9,933,887 B2
(45) Date of Patent: Apr. 3, 2018

(54) DISPLAY DEVICE AND METHOD OF DRIVING THE SAME

(71) Applicant: Samsung Display Co., Ltd., Yongin-si, Gyeonggi-do (KR)

(72) Inventor: Yongseok Choi, Yuseong-gu (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 206 days.

(21) Appl. No.: 14/936,429

(22) Filed: Nov. 9, 2015

(65) Prior Publication Data

US 2016/0231850 A1    Aug. 11, 2016

(30) Foreign Application Priority Data

Feb. 5, 2015 (KR) .................. 10-2015-0018102

(51) Int. Cl.
    *G06F 3/041*     (2006.01)
    *G06F 1/16*      (2006.01)
    *G09G 3/20*      (2006.01)
    *G06F 3/045*     (2006.01)

(52) U.S. Cl.
    CPC .......... *G06F 3/0416* (2013.01); *G06F 1/1652* (2013.01); *G06F 3/045* (2013.01); *G09G 3/2003* (2013.01); *G09G 2320/0666* (2013.01); *G09G 2320/0673* (2013.01); *G09G 2380/02* (2013.01)

(58) Field of Classification Search
    CPC ...... G06F 3/0416; G06F 1/1652; G06F 3/045; G09G 3/2003; G09G 2380/02; G09G 2320/0666; G09G 2320/0673
    See application file for complete search history.

(56) References Cited

U.S. PATENT DOCUMENTS

| 2013/0215041 A1* | 8/2013 | Kim ................. G06F 3/0487 345/173 |
| 2013/0215088 A1* | 8/2013 | Son .................. G09G 5/40 345/204 |
| 2014/0015743 A1* | 1/2014 | Seo .................. G06F 1/1694 345/156 |
| 2014/0306985 A1* | 10/2014 | Jeong ............... G09G 3/3233 345/601 |
| 2016/0071457 A1* | 3/2016 | Kim ................. G09G 3/2003 345/690 |

(Continued)

FOREIGN PATENT DOCUMENTS

| KR | 10-2006-0004427 A | 1/2006 |
| KR | 10-2011-0080784 A | 7/2011 |

(Continued)

*Primary Examiner* — Andrew Sasinowski
(74) *Attorney, Agent, or Firm* — Knobbe Martens Olson & Bear LLP (57) ABSTRACT

A display device and method of driving the same are disclosed. In one aspect, the display device includes a flexible display panel and a flexible touch panel disposed on one surface of the flexible display panel. The flexible touch panel is configured to output a plurality of sensing signals indicating a bent shape of the display device. The display device also includes a controller configured to receive the sensing signals, determine the bent shape of the display device based on the received sensing signals, compensate an input image signal based on the determined bent shape so as to generate a gradation signal and provide the gradation signal to the flexible display panel.

17 Claims, 8 Drawing Sheets

(56) References Cited

U.S. PATENT DOCUMENTS

2016/0231850 A1* 8/2016 Choi .................... G06F 3/0416

FOREIGN PATENT DOCUMENTS

| KR | 10-2013-0006757 A | 1/2013 |
| KR | 10-2013-0080937 A | 7/2013 |
| KR | 10-2014-0004863 A | 1/2014 |
| KR | 10-2014-0078922 A | 6/2014 |
| KR | 10-1472021 B1 | 12/2014 |

* cited by examiner

DISPLAY DEVICE AND METHOD OF DRIVING THE SAME

CROSS-REFERENCE TO RELATED APPLICATIONS

This U.S. non-provisional patent application claims priority under 35 U.S.C. § 119 of Korean Patent Application No. 10-2015-0018102, filed on Feb. 5, 2015, the entire contents of which are hereby incorporated by reference.

BACKGROUND

Field

The described technology generally relates to a display device and a method of driving the same, and more particularly, to a deformable display device and a method of driving the same.

Description of the Related Technology

Electronic devices that can be used to display images, such as smartphones, digital cameras, laptop computers, navigation systems and televisions (TVs), include a display panel for displaying the images.

In general, flat display panels that are lightweight and have a thin profile are widely used in electronic devices. Different types of flat display panel technologies include liquid crystal display (LCD) panels, organic light-emitting diode (OLED) display panels, electrophoretic display (EPD) panels and the like.

Moreover, foldable or flexible display devices have been recently developed. Such devices can be formed to be lightweight, have a thin profile, and be resistant to breakage, and thus, can be used in not only traditional electronic devices but also as a component in clothes (wearable devices) or paper media.

SUMMARY OF CERTAIN INVENTIVE ASPECTS

One inventive aspect is a display device for controlling an image according to a change in shape of the device.

Another aspect is a method for driving the display device.

Another aspect is a display device comprising a flexible display panel; a flexible touch panel disposed on one surface of the flexible display panel, wherein the flexible touch panel is configured to output a plurality of sensing signals indicating a bent shape of the display device; and a controller configured to: i) receive the sensing signals, ii) determine the bent shape of the display device based on the received sensing signals, iii) compensate an input image signal based on the determined bent shape so as to generate a gradation signal and iv) provide the gradation signal to the flexible display panel.

In exemplary embodiments, the sensing signals comprise a first sensing signal corresponding to a center portion of the flexible touch panel and a second sensing signal correspond to an edge portion of the flexible touch panel spaced apart from the center portion, wherein the controller is further configured to: i) compare the first and second sensing signals and ii) determine the bent shape based on the result of the comparison.

In exemplary embodiments, the controller is further configured to: i) determine whether the first and second sensing signals are different from each other based on the comparison and ii) compensate a color temperature of the image signal in response to determining that the first and second sensing signals are different from each other.

In exemplary embodiments, a level of the first sensing signal is different from that of the second sensing signal when the flexible touch panel has a shape in which the flexible touch panel is bent along a first direction.

In exemplary embodiments, the flexible touch panel is a resistive touch panel.

In exemplary embodiments, a color temperature of an image displayed on the flexible display panel when the first sensing signal is substantially the same as the second sensing signal is defined as a reference color temperature, and wherein the controller is further configured to: i) compensate a color temperature of the image signal so that the color temperature of the image signal is less than the reference color temperature when a level of the first sensing signal is less than that of the second sensing signal.

In exemplary embodiments, the controller is further configured to compensate the color temperature of the image signal so that the color temperature of the image signal is greater than the reference color temperature when the level of the first sensing signal is greater than that of the second sensing signal.

In exemplary embodiments, the controller is further configured to compensate the image signal in black and white when the level of the first sensing signal is greater than that of the second sensing signal.

In exemplary embodiments, the flexible display panel lies on a first plane when the flexible display panel is flat and a viewpoint of a viewer lies on a second plane which is parallel with the first plane, wherein a distance between the center portion and the second plane is a first distance, a distance between the edge portion and the second plane is a second distance, and a color temperature of an image displayed on the flexible display panel when the first distance is substantially equal to the second distance is defined as a reference color temperature, and wherein the controller is further configured to compensate a color temperature of the image signal so that the color temperature of the image signal is less than the reference color temperature when the first distance is greater than the second distance.

In exemplary embodiments, the controller is further configured to compensate the color temperature of the image signal so that the color temperature of the image signal is greater than the reference color temperature when the first distance is less than the second distance.

In exemplary embodiments, the controller is further configured to compensate at least one of a color temperature and a gamma value of the image signal.

In exemplary embodiments, the controller comprises a bending detection unit configured to: i) receive the sensing signals, ii) determine the bent shape based on the received sensing signals, and iii) output a shape determination signal; a memory configured to store a compensation value; a compensation unit configured to: i) read a compensation value corresponding to the shape determination signal from the memory ii) compensate the image signal with the compensation value so as to generate an image data signal and ii) output the image data signal; and a signal driver configured to: i) convert the image data signal into the gradation signal and ii) provide the gradation signal to the flexible display panel.

In exemplary embodiments, the flexible display panel comprises a plurality of gate lines, a plurality of data lines, and a plurality of pixels respectively connected to the gate lines and the data lines, and wherein the signal driver comprises: a gate driver configured to drive the gate lines;

and a data driver configured to: i) convert the image data signal into the gradation signal and ii) provide the gradation signal to the data lines.

Another aspect is a method of driving a display device comprising a flexible display panel and a flexible touch panel disposed on one surface of the flexible display panel, the method comprising receiving a first sensing signal corresponding to a center portion of the flexible touch panel and a second sensing signal corresponding to an edge portion of the flexible touch panel; comparing the first and second sensing signal so as to determine a bent shape of the flexible touch panel; compensating an input image signal based on the determined bent shape so as to generate an image data signal; converting the image data signal into a gradation signal; and applying the gradation signal to the flexible display panel.

In exemplary embodiments, the generating the image data signal comprises reading a compensation value corresponding to the bent shape from a memory configuring to store a compensation value; and compensating the image signal using the compensation value.

In exemplary embodiments, a level of the first sensing signal is different from that of the second sensing signal when the flexible touch panel has a shape in which the flexible touch panel is bent along a first direction.

In exemplary embodiments, the flexible touch panel is a resistive touch panel and a color temperature of an image displayed on the flexible display panel when the first sensing signal is substantially the same as the second sensing signal is defined as a reference color temperature, and wherein the method further comprises compensating the color temperature of the image signal so that the color temperature of the image signal is less than the reference color temperature when a level of the first sensing signal is less than that of the second sensing signal.

In exemplary embodiments, the method further comprises compensating the color temperature of the image signal so as to be greater than the reference color temperature when the level of the first sensing signal is greater than the second sensing signal.

In exemplary embodiments, the method further comprises compensating at least one of a color temperature and a gamma value of the image signal so as to generate the image data signal.

Another aspect is a display device comprising a flexible display panel; a flexible touch panel disposed on one surface of the flexible display panel; a detection unit configured to: i) receive a plurality of sensing signals from the flexible touch panel, ii) determine a bent shape of the flexible touch panel based on the sensing signals, and iii) output a shape determination signal based on the determined bent shape; a compensation unit configured to: i) receive an input image signal and the shape determination signal ii) compensate the image signal based on the shape determination signal and iii) output the compensated image data signal; and a signal driver configured to: i) convert the compensated image data signal into a gradation signal and ii) provide the gradation signal to the flexible display panel.

BRIEF DESCRIPTION OF THE DRAWINGS

The accompanying drawings are included to provide a further understanding of the described technology, and are incorporated in and constitute a part of this specification. The drawings illustrate exemplary embodiments and, together with the description, serve to explain principles of the described technology. In the drawings.

DETAILED DESCRIPTION OF CERTAIN INVENTIVE EMBODIMENTS

Exemplary embodiments of the described technology will be described below in more detail with reference to the accompanying drawings. The described technology may, however, be embodied in different forms and should not be construed as limited to the embodiments set forth herein. Rather, these embodiments are provided so that this disclosure will be thorough and complete, and will fully convey the scope of the described technology to those skilled in the art. In the following description and the drawings, the same reference numerals represent the same elements.

The terms "first", "second" and the like used herein are not intended to limit elements but are used to distinguish one element from another element. It should be understood that when a layer, a region, or an element is referred to as being present "on" another part, it can be directly placed on the other part or intervening layers, regions or elements may be present.

Figure 1:
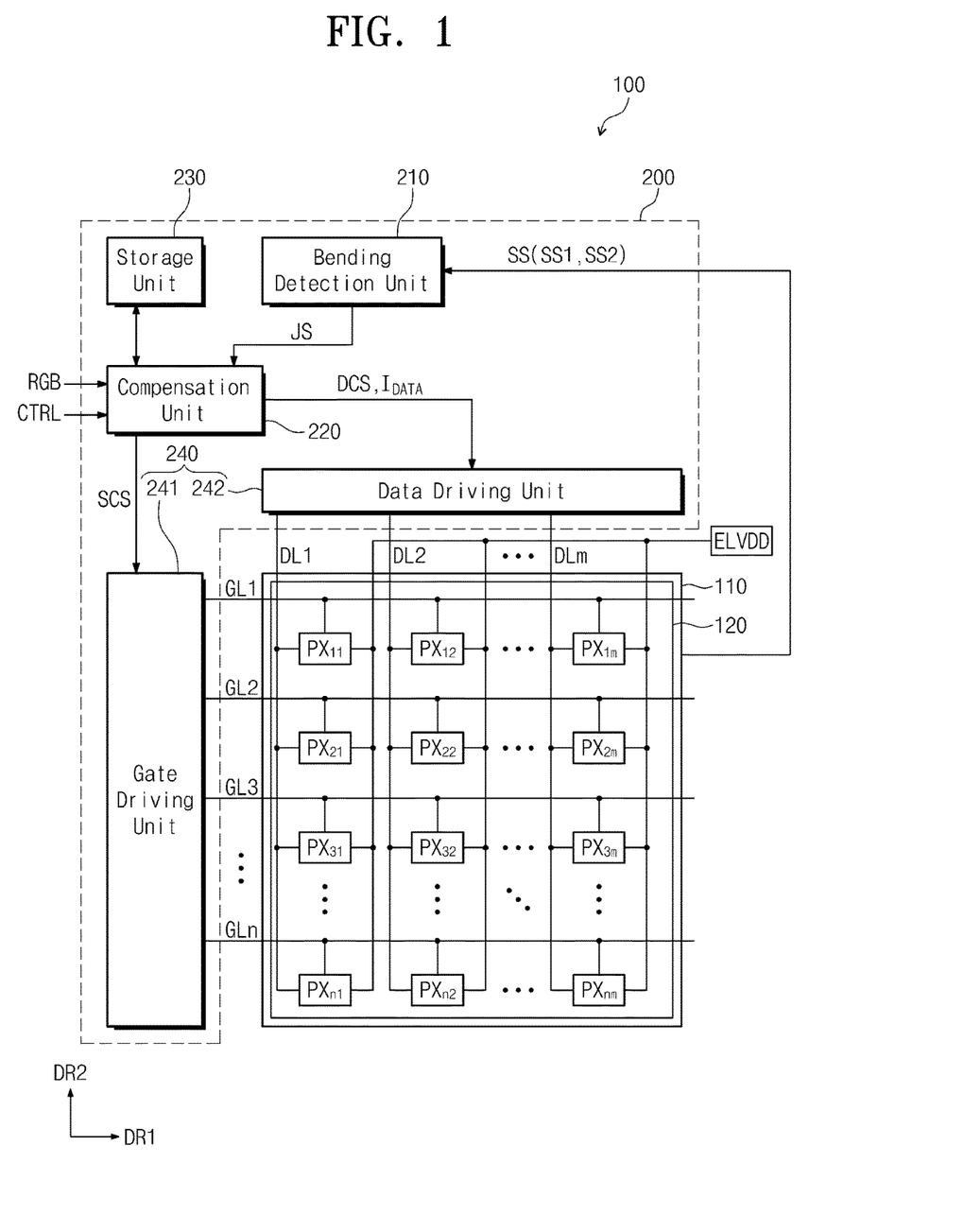
FIG. 1 is a schematic block diagram illustrating a configuration of a display device according to an embodiment.
Figure 2A:
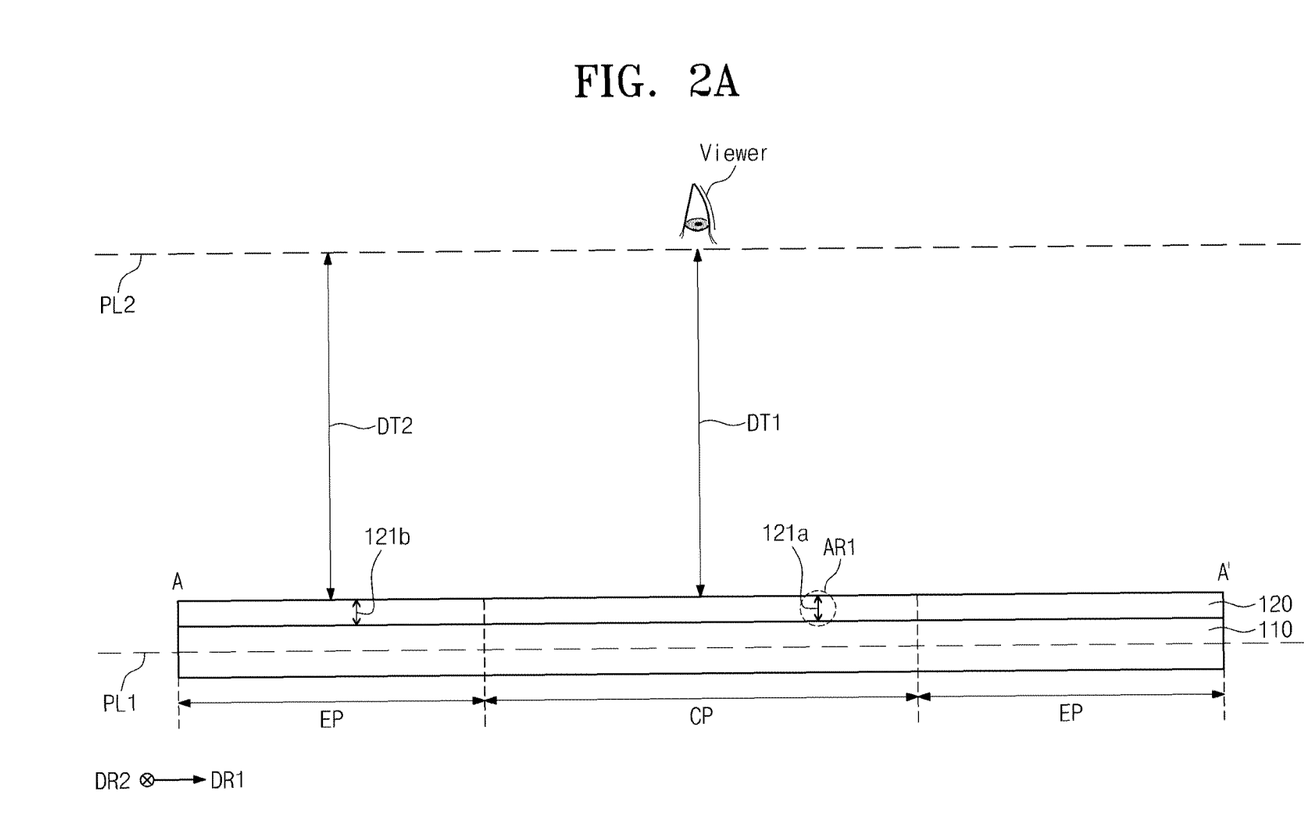
FIG. 2A is a side view of a display device according to an embodiment.
Figure 2B:
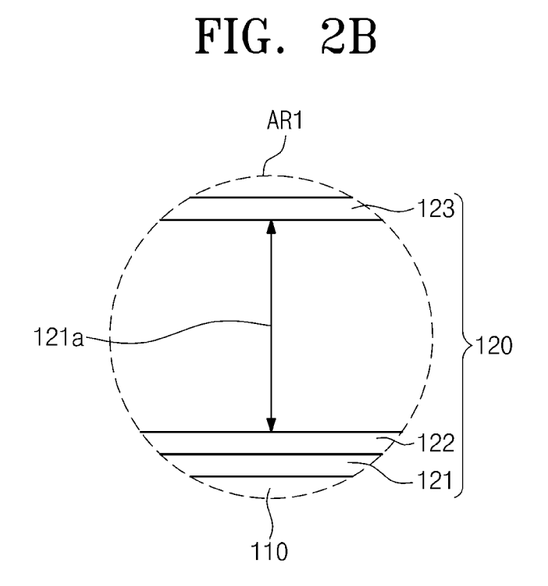
FIG. 2B is an enlarged view of one region of FIG. 2A.

FIG. 1 is a schematic block diagram illustrating a configuration of a display device according to an embodiment. FIG. 2A is a side view of a display device according to an embodiment. FIG. 2B is an enlarged view of one region of FIG. 2A.

Referring to FIGS. 1, 2A and 2B, the display device 100 includes a flexible display panel 110, a flexible touch panel 120, and a controller 200.

The flexible display panel 110 can display state information, for example, the configuration of the flexible display panel 110, generated while the flexible display panel 110 is in operation, in addition to numbers, characters, videos or still images. The flexible display panel 110 can include a foldable display unit that can be folded at least once or a flexible display unit containing a flexible material such as plastic so as to be bent like paper. For example, the flexible display panel 110 can display images while being bent.

The flexible touch panel 120 can be disposed on the flexible display panel 110. The flexible touch panel 120 can be operated on the basis of at least one of: a capacitive sensing scheme, a resistive sensing scheme, an infrared sensing scheme, and an ultraviolet sensing scheme. The flexible touch panel 120 can be flexible similar to the flexible display panel 110. Therefore, the flexible touch panel 120 can be changed in shape as the shape of the flexible display panel 110 is changed. The flexible touch panel 120 can output sensing signals SS corresponding to the bent shape of the flexible touch panel 120.

The flexible touch panel 120 can include a center portion CP and an edge portion EP. The center portion CP and the edge portion EP can be defined along a bending direction of the flexible touch panel 120. For example, when the flexible touch panel 120 is bent along a first direction DR1, the center portion CP and the edge portion EP can be sequentially defined along the first direction DR1.

The sensing signals SS can include a first sensing signal SS1 generated from the center portion CP and a second sensing signal SS2 generated from the edge portion EP.

When the flexible touch panel 120 is a resistive touch panel, the sensing signals SS can include information related to pressure. Referring to FIG. 2B, which is an enlarged view of one region AR1 of the flexible touch panel 120, the flexible touch panel 120 can include an adhesive part or adhesive 121, a first electrode 122 formed on the adhesive part 121, and a second electrode 123 facing the first electrode 122 and being spaced apart from the first electrode 122. In another embodiment, the adhesive part 121 may not be included.

As the shape of the flexible touch panel 120 changes, the distance between the first electrode 122 and the second electrode 123 also changes. The distance between the first electrode 122 and the second electrode 123 can be changed by, for example, an external pressure.

When the shape of the flexible touch panel 120 changes, different pressures can be applied to different locations on the flexible touch panel 120. The pressure can be generated due to the change in the shape of the flexible touch panel 120. When the distance between the first electrode 122 and the second electrode 123 changes, predetermined pieces of information can change accordingly. The information may be any one of voltage, resistance and capacitance. The sensing signals SS can include a signal corresponding to the information.

When the flexible touch panel 120 is a capacitive touch panel, the sensing signals SS can include information on a change in capacitance. In these embodiments, a sensing scheme based on measurement of a change in mutual capacitance or a sensing scheme based on measurement of a change in self capacitance can be adopted for the flexible touch panel 120.

The controller 200 can receive an image signal RGB, a control signal CTRL and the sensing signals SS, and can provide, to the flexible display panel 110, a gradation signal obtained by compensating the image signal RGB according to the bent shape.

The controller 200 can include a bending detection unit 210, a compensation unit 220, a memory 230, and a signal diver 240.

The bending detection unit 210 can receive the sensing signals SS to determine whether the flexible touch panel 120 is bent and can output a shape determination signal JS according to the result of the determination. The bending detection unit 210 can compare the first sensing signal SS1 with the second sensing signal SS2 to recognize the bent shape of the flexible touch panel 120.

For example, when the flexible touch panel 120 is flat, the level of the first sensing signal SS1 can be substantially equal to that of the second sensing signal SS2. When the flexible touch panel 120 is bent, the level of the first sensing signal SS1 can be different from that of the second sensing signal SS2.

The bending detection unit 210 can be designed so as to determine that the display device 100 is bent when the sensing signals SS differ in level from each other for at least a certain period of time. Therefore, in certain embodiments, the shape determination signal JS is not output when a user touches the panel to manipulate the panel. That is, the bending detection unit 210 can differentiate the sensing signals SS generated according to bending of the display device 100 from a touch signal generated by a typical touch of the user.

Figure 3A:
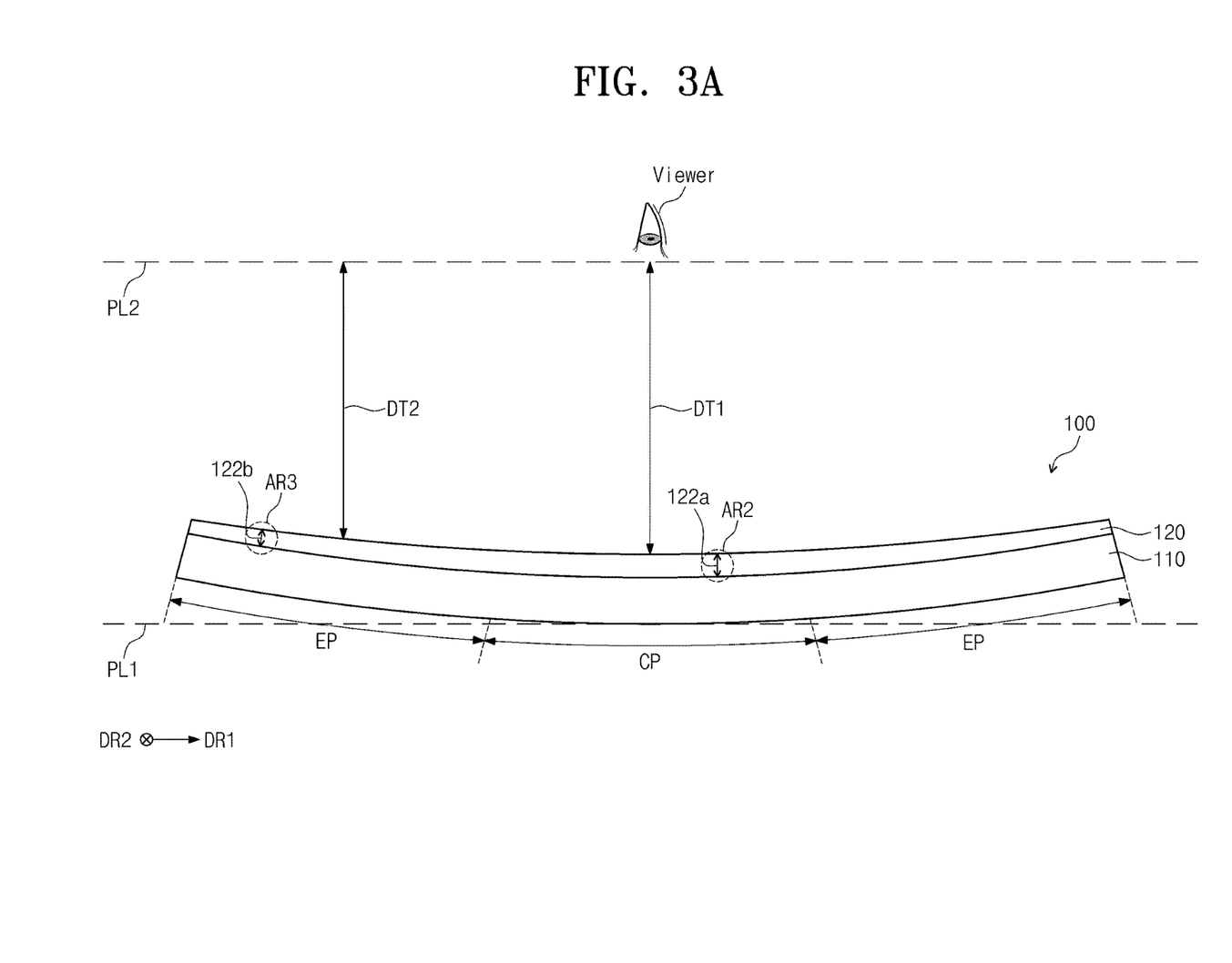
FIG. 3A is a side view of a display device according to an embodiment.
Figure 4A:
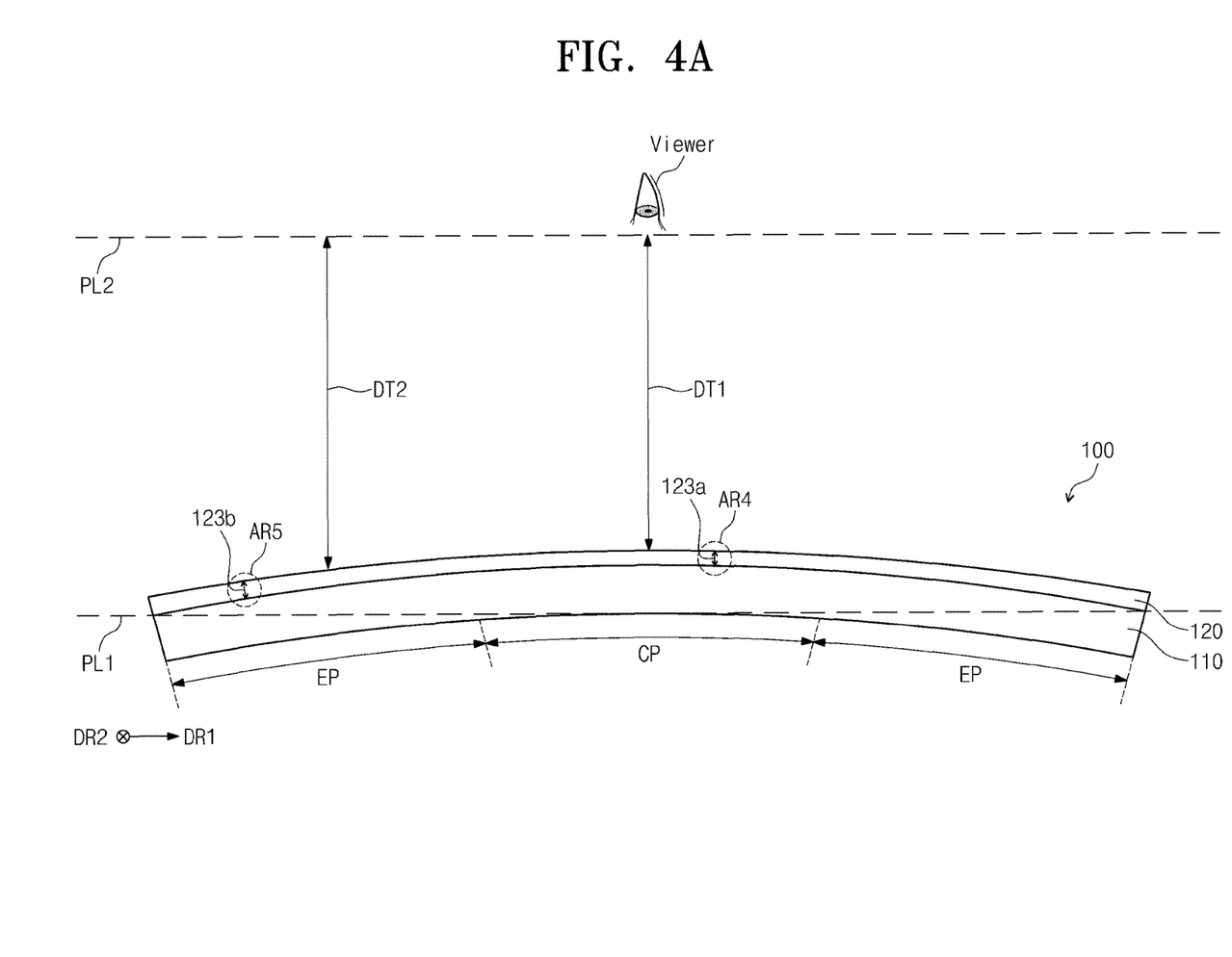
FIG. 4A is a side view of a display device according to an embodiment.

With respect to a viewpoint of a viewer, the display device 100 can have a first shape in which the display device 100 is concavely bent and a second shape in which the display device 100 is convexly bent. The display device 100 can be bent in the first shape as illustrated in FIG. 3A, and may be bent in the second shape as illustrated in FIG. 4A. Such states or configurations of the display device 100 will be described in detail with reference to FIGS. 3A and 4A.

The compensation unit 220 can receive the image signal RGB, the control signal CTRL, and the shape determination signal JS and can output an image data signal $I_{DATA}$, converted so as to be matched to an operation mode of the flexible display panel 110, in addition to various control signals SCS and DCS. The image signal RGB and the control signal CTRL can be received from an external source, and the shape determination signal JS can be received from the bending detection unit 210.

The compensation unit 220 can refer to the memory 230 that stores a compensation value, in order to compensate the image signal RGB. The memory 230 can store gradation value compensation data of the image signal RGB for compensating a color temperature of the image signal RGB. For example, the memory 230 can be a lookup table containing compensation values corresponding to gradation values of the shape determination signal JS and the image signal RGB. Furthermore, in another embodiment, the memory 230 stores an equation for compensating the gradation value of the image signal RGB according to the shape determination signal JS.

The compensation unit 220 can read, from the memory 230, a compensation value corresponding to the shape determination signal JS and can output the image data signal $I_{DATA}$ obtained by compensating the image signal RGB with the compensation value.

The signal diver 240 can include a gate driver 241 and a data driver 242.

The gate driver 241 can receive a gate driving control signal SCS from the compensation unit 220. The gate driver 241, supplied with the gate driving control signal SCS, can generate a plurality of gate signals. The gate signals can be sequentially supplied to the flexible display panel 110.

The data driver 242 can receive a data driving control signal DCS and the image data signal $I_{DATA}$ from the compensation unit 220. The data driver 242 can generate a plurality of gradation signals on the basis of the data driving control signal DCS and the image data signal $I_{DATA}$. The gradation signals can be supplied to the flexible display panel 110.

The flexible display panel 110 receives an electric signal to display an image. The flexible display panel 110 can include a plurality of gate lines GL1 to GLn, a plurality of data lines DL1 to DLm, and a plurality of pixels $PX_{11}$ to $PX_{nm}$.

The gate lines GL1 to GLn can extend in the first direction DR1 and can be arranged in a second direction DR2 perpendicular to the first direction DR1. The gate lines GL1 to GLn can be sequentially supplied with the gate signals from the gate driver 241.

The data lines DL1 to DLm can be insulated from the gate lines GL1 to GLn and intersect with the gate lines GL1 to GLn. The data lines DL1 to DLm cam extend in the second direction DR2 and can be arranged in the first direction DR1. The data lines DL1 to DLm can receive the gradation signals from the data driver 242.

The flexible display panel 110 can receive a first power supply voltage ELVDD and a second power supply voltage ELVSS from an external source, such as a power supply, which can be include in the display device. The pixels $PX_{11}$ to $PX_{nm}$ can be turned on in response to corresponding gate signals. Each of the pixels $PX_{11}$ to $PX_{nm}$ can receive the first power supply voltage ELVDD and the second power supply voltage ELVSS and can generate light in response to a corresponding gradation signal. The first power supply voltage ELVDD can be higher than the second power supply voltage ELVSS.

In this embodiment, the pixels $PX_{11}$ to $PX_{nm}$ can be arranged in a matrix, but are not limited thereto. The pixels $PX_{11}$ to $PX_{nm}$ can be connected to corresponding gate lines among the gate lines GL1 to GLn and can be connected to corresponding data lines among the data lines DL1 to DLm.

The pixels $PX_{11}$ to $PX_{nm}$ can receive the gate signals from the corresponding gate lines and can receive the gradation signals from the corresponding data lines. The pixels $PX_{11}$ to $PX_{nm}$ can be turned on in response to corresponding gate signals. The pixels $PX_{11}$ to $PX_{nm}$ can generate light corresponding to the gradation signals to display an image.

Each of the pixels $PX_{11}$ to $PX_{nm}$ can include at least one transistor, at least one capacitor, and an organic light-emitting diode (OLED). In this embodiment, the flexible display panel 110 is described as an OLED panel, but is not limited thereto. For example, in another embodiment, the flexible display panel 110 can be any one of a liquid crystal display (LCD) panel, an electro-wetting display (EWD) panel, an electrophoretic display (EPD) panel, and a micro-electro-mechanical system (MEMS) display panel.

In another embodiment, the controller 200 further includes a viewpoint tracking unit (not shown). This unit can be employed when the display device 100 is a double-sided display device. The viewpoint tracking unit can include position tracking sensors for measuring the viewing position of a viewer that views the flexible display panel 110. The position tracking sensor can employ an optical sensor or a motion detection sensor for detecting the viewing position. The compensation unit 220 can compensate the image signal RGB using the shape determination signal JS and information on the viewing position received from the viewpoint tracking unit.

In another embodiment, the controller 200 further includes at least one memory unit or memory (not shown). A first memory unit can store the image data signal $I_{DATA}$ corresponding to one frame before transferring the image data signal $I_{DATA}$ to the data driver 242. A second memory unit can store the image signal RGB corresponding to one frame before transferring the image signal RGB to the compensation unit 220. Depending on the embodiment, the controller 200 can include none, one or both of the first and second memory units.

FIG. 2A illustrates that the display device 100 is flat. Herein, the flat flexible display panel 110 lies on a plane which is defined as a first plane PL1, and a virtual plane that is parallel to the first plane PL1 and on which the viewpoint of the viewer lies is defined as a second plane PL2.

When the display device 100 is flat, a first distance DT1 between the second plane PL2 and the center portion CP can be substantially equal to a second distance DT2 between the second plane PL2 and the edge portion EP. Here, a first distance 121a between the first electrode 122 and the second electrode 123 at the center portion CP can be substantially equal to a second distance 121b between the first electrode 122 and the second electrode 123 at the edge portion EP.

Since the first distance 121a is substantially equal to the second distance 121b, the first sensing signal SS1 can be substantially the same as the second sensing signal SS2. Therefore, the bending detection unit 210 can output the shape determination signal JS indicating that the display device 100 is flat.

When the display device 100 is flat, the color temperature of an image displayed on the flexible display panel 110 can be defined as a reference color temperature. The reference color temperature can be from about 7000K to about 8000K. Accordingly, a white image displayed on the flexible display panel 110 can be tinged with a blue color. The color temperature of from about 7000K to about 8000K can be typically used in a web surfing mode or the like, and the reference color temperature can be adjusted according to the preference of the user.

Figure 3B:
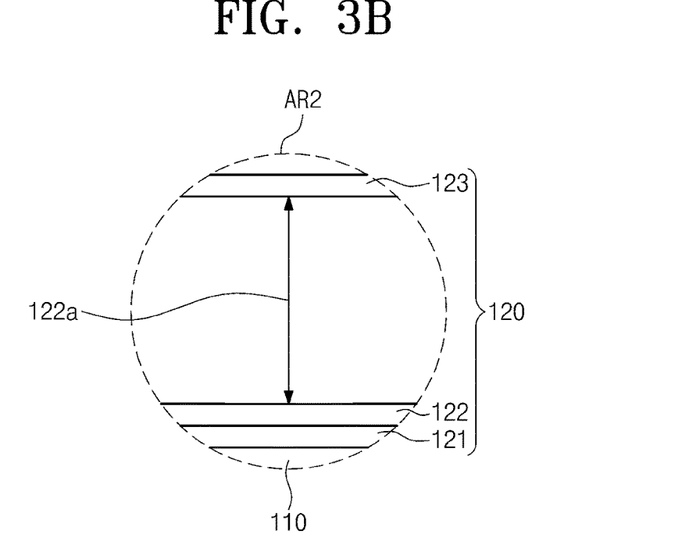
FIG. 3B is an enlarged view of one region of FIG. 3A.
Figure 3C:
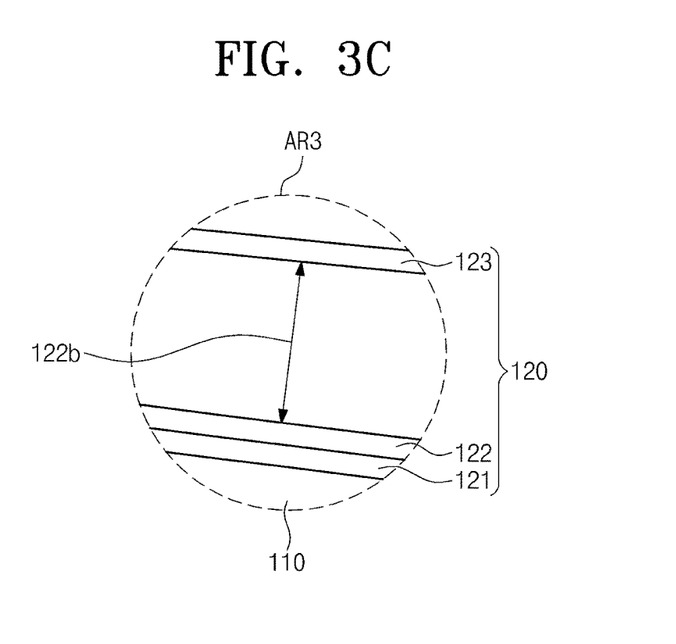
FIG. 3C is an enlarged view of one region of FIG. 3A.

FIG. 3A is a side view of a display device according to an embodiment. FIG. 3B is an enlarged view of one region of FIG. 3A. FIG. 3C is an enlarged view of one region of FIG. 3A. In detail, FIG. 3A is an enlarged view of a region AR2 of the center portion CP, and FIG. 3B is an enlarged view of a region AR3 of the edge portion EP. The reference numerals used for providing description with reference to FIG. 2A are also used for providing description with reference to FIGS. 3A, 3B and 3C, and detailed description thereof is not provided.

Referring to FIGS. 1, 3A, 3B and 3C, the display device 100 can be bent along the first direction DR1. In this embodiment, the display device 100 can have the first shape in which the display device 100 is concavely bent with respect to the viewpoint of the viewer.

When the flexible display panel 110 and the flexible touch panel 120 are bent in the first shape, the first distance DT1 between the second plane PL2 and the center portion CP can be different from the second distance DT2 between the second plane PL2 and the edge portion EP. In this embodiment, the first distance DT1 can be greater than the second distance DT2.

When the display device 100 is bent in the first shape, pressure applied to the center portion CP can be different from that applied to the edge portion EP. In this embodiment, the pressure applied to the flexible touch panel 120 can be lower at the center portion CP than at the edge portion EP. Therefore, the first distance 122a between the first electrode 122 and the second electrode 123 at the center portion CP can be greater than the second distance 122b between the first electrode 122 and the second electrode 123 at the edge portion EP.

When the first and second sensing signals SS1 and SS2 have levels proportional to pressure, the level of the first sensing signal SS1 can be lower than that of the second sensing signal SS2. In this situation, the bending detection unit 210 can output the shape determination signal JS corresponding to the first shape.

When the viewer views the display device 100 while the display device 100 has the first shape, the display device 100 can provide an image of a video mode. The color temperature of the image displayed in the video mode can be lower than the reference color temperature. Therefore, when the shape determination signal JS corresponding to the first shape is input to the compensation unit 220, the compensation unit 220 can decrease the color temperature of the image signal RGB to a lower temperature than the reference color temperature.

The display device 100 bent in the first shape can display an image having a color temperature of from about 4000K to about 7000K. In this situation, a white image displayed on the flexible display panel 110 can be tinged with a yellow color. The color temperature can be adjusted according to the preference of the user.

According to this embodiment, the viewer can select a mode for an image displayed on the flexible display panel 110 by simply bending the display device 100 without performing additional manipulation. Therefore, the display device 100 can be manipulated with ease, and a display environment of the display device 100 can be improved.

Figure 4B:
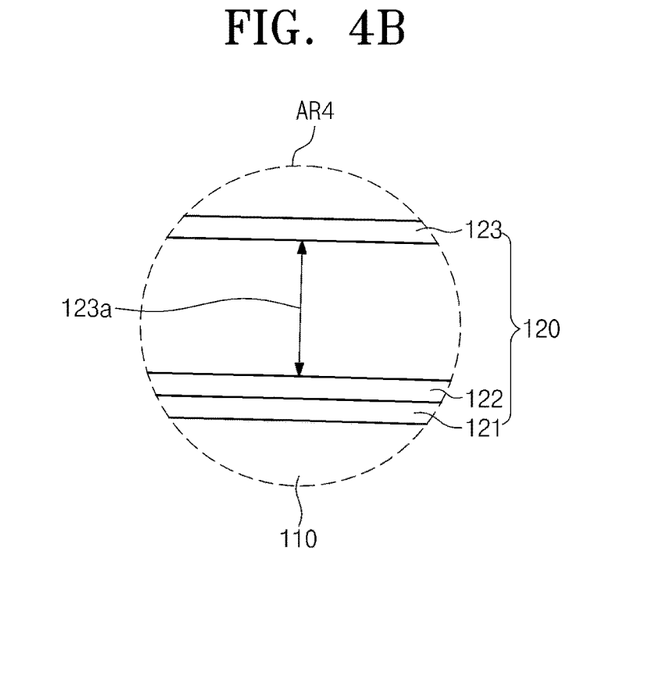
FIG. 4B is an enlarged view of one region of FIG. 4A.
Figure 4C:
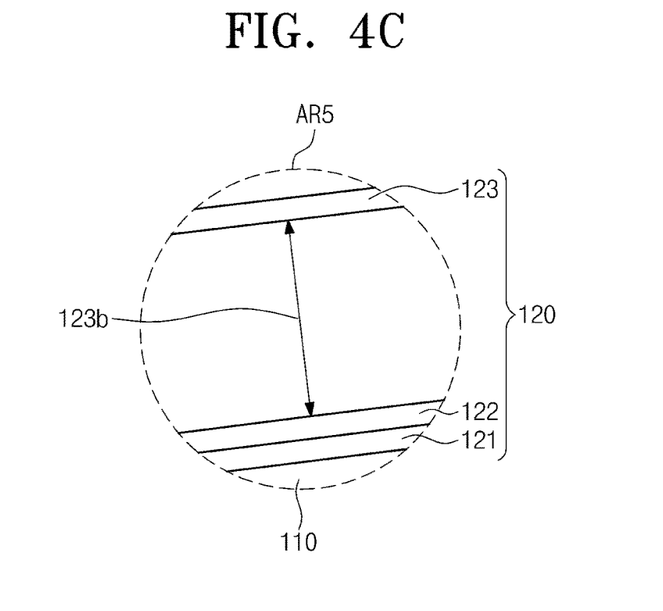
FIG. 4C is an enlarged view of one region of FIG. 4A.

FIG. 4A is a side view of a display device according to an embodiment. FIG. 4B is an enlarged view of one region of FIG. 4A. FIG. 4C is an enlarged view of one region of FIG. 4A. In detail, FIG. 4A is an enlarged view of a region AR4 of the center portion CP, and FIG. 4B is an enlarged view of a region AR5 of the edge portion EP. The reference numerals used for providing description with reference to FIG. 2A are also used for providing description with reference to FIGS. 4A, 4B and 4C, and detailed description thereof is not provided.

Referring to FIGS. 1, 4A, 4B and 4C, the display device 100 can be bent along the first direction DR1. In this embodiment, the display device 100 can have the second shape in which the display device 100 is convexly bent with respect to the viewpoint of the viewer.

When the flexible display panel 110 and the flexible touch panel 120 are bent in the second shape, the first distance DT1 between the second plane PL2 and the center portion CP can be different from the second distance DT2 between the second plane PL2 and the edge portion EP. In this embodiment, the first distance DT1 can be less than the second distance DT2.

When the display device 100 is bent in the second shape, the pressure applied to the flexible touch panel 120 can vary with locations thereon. In this embodiment, the pressure applied to the flexible touch panel 120 can be higher at the center portion CP than at the edge portion EP. Therefore, the first distance 123a between the first electrode 122 and the second electrode 123 at the center portion CP can be less than the second distance 123b between the first electrode 122 and the second electrode 123 at the edge portion EP.

When the first and second sensing signals SS1 and SS2 have levels proportional to pressure, the level of the first sensing signal SS1 can be greater than that of the second sensing signal SS2. In this situation, the bending detection unit 210 can output the shape determination signal JS corresponding to the second shape.

The viewer can bend the display device 100 to share an image with other viewers or improve the visibility of the image in an outdoor environment. Therefore, when the viewer views the display device 100 while the display device 100 has the second shape, the display device 100 can provide any one of images of various modes for improving the visibility of the image.

Various image compensation methods can be used for improving the visibility, for example, increasing a color temperature to a higher temperature than the reference color temperature, expressing the image signal RGB with seven colors (e.g., red, green, blue, cyan, magenta, yellow and white), and adjusting a gamma value of an image. According to the method of adjusting the gamma value, the luminance of the display device 100 when the display device is bent can be adjusted to be greater than when the display device 100 is flat.

Upon receiving the shape determination signal JS corresponding to the second shape, the compensation unit 220 can compensate the image signal RGB in a high-visibility mode using the above-mentioned methods.

According to this embodiment, the viewer can select a mode for an image displayed on the flexible display panel 110 by simply bending the display device 100 without performing additional manipulation. Therefore, the display device 100 can be manipulated with ease, and the visibility of the display device 100 may be improved.

Figure 5:
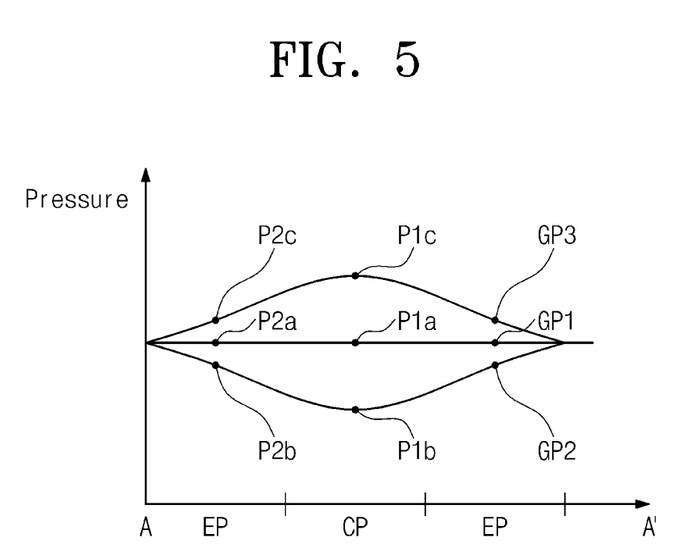
FIG. 5 is a graph schematically illustrating a pressure distribution according to the locations on the flexible touch panel illustrated in FIGS. 2A, 3A and 4A.

FIG. 5 is a graph schematically illustrating a pressure distribution according to the locations on the flexible touch panel illustrated in FIGS. 2A, 3A and 4A.

FIG. 5 shows the pressure distribution on the flexible touch panel 120 along line A-A' of FIG. 2A.

A first curve GP1 shows the pressure distribution when the display device 100 is flat, a second curve GP2 shows the pressure distribution when the display device 100 is deformed in the first shape, and a third curve GP3 shows the pressure distribution when the display device 100 is deformed in the second shape.

When the display device 100 is flat, the pressures detected from each location on the flexible touch panel 120 can be substantially the same. That is, a first pressure P1a detected from the center portion CP can be substantially the same as a second pressure P2a detected from the edge portion EP. As a result, the first sensing signal SS1 and the second sensing signal SS2 can have substantially the same level.

When the display device 100 is bent in the first shape, a first pressure P1b detected from the center portion CP can be less than a second pressure P2b detected from the edge portion EP. As a result, the level of the first sensing signal SS1 can be less than that of the second sensing signal SS2. Therefore, the display device 100 can decrease the color temperature of an image to a temperature less than the reference color temperature to output the image.

When the display device 100 is bent in the second shape, a first pressure P1c detected from the center portion CP can be greater than a second pressure P2c detected from the edge portion EP. As a result, the level of the first sensing signal SS1 can be greater than that of the second sensing signal SS2. Therefore, the display device 100 can increase the color temperature of an image to a temperature greater than the reference color temperature to output the image.

Although it has been described that a bending direction is determined on the basis of a difference between pressures on the flexible touch panel 120, a method of determining the bending direction is not limited thereto. For example, in another embodiment, the bending direction of the flexible touch panel 120 can be determined on the basis of a sensing signal including an amount of change in voltage or an amount of change in capacitance.

Furthermore, although it has been described that an image is converted in three modes according to the bending direction, a method of converting an image is not limited thereto. For example, in another embodiment, an image can be converted in three or more modes according to a level difference between the first sensing signal SS1 and the second sensing signal SS2. For example, if the display device 100 is bent to at least a certain degree, warning information can be displayed to the viewer by changing a color of an image into a red color. However, a method of notifying warning information is not limited thereto. For example, a warning message can be displayed on the image or the use can be notified via another method such as an audio or haptic message.

According to at least one embodiment, the image signal RGB can be compensated according to the bent shapes of the flexible display panel 110 and the flexible touch panel 120. Therefore, the viewer can view images of various modes according to the bent shapes without performing additional manipulation. That is, the display device 100 can be manipulated with ease, and the display environment and the visibility of the display device 100 can be improved.

As described above, the controller can compensate the image signal according to the bent shape of the display device, so that the color temperature or the gamma value of an image can be easily changed without additional manipulation. Therefore, the display device can be manipulated with ease, and the display environment of the display device can be improved.

The above-disclosed subject matter is to be considered illustrative and not restrictive, and the appended claims are intended to cover all such modifications, enhancements, and other embodiments, which fall within the true spirit and scope of the inventive technology. Thus, to the maximum extent allowed by law, the scope of the invention is to be determined by the broadest permissible interpretation of the following claims and their equivalents, and shall not be restricted or limited by the foregoing detailed description.

What is claimed is:

1. A display device, comprising:
   a flexible display panel;
   a flexible touch panel disposed on one surface of the flexible display panel, wherein the flexible touch panel is configured to output a plurality of sensing signals indicating a bent shape of the display device; and
   a controller configured to: i) receive the sensing signals, ii) determine the bent shape of the display device based on the received sensing signals, iii) compensate an input image signal based on the determined bent shape so as to generate a gradation signal and iv) provide the gradation signal to the flexible display panel,
   wherein the sensing signals comprise a first sensing signal corresponding to a center portion of the flexible touch panel and a second sensing signal correspond to an edge portion of the flexible touch panel spaced apart from the center portion, wherein the controller is further configured to: i) compare the first and second sensing signals and ii) determine the bent shape based on the result of the comparison,
   wherein a color temperature of an image displayed on the flexible display panel when the first sensing signal is substantially the same as the second sensing signal is defined as a reference color temperature, and
   wherein the controller is further configured to: i) compensate a color temperature of the image signal so that the color temperature of the image signal is less than the reference color temperature when a level of the first sensing signal is less than that of the second sensing signal.

2. The display device of claim 1, wherein the controller is further configured to: i) determine whether the first and second sensing signals are different from each other based on the comparison and ii) compensate a color temperature of the image signal in response to determining that the first and second sensing signals are different from each other.

3. The display device of claim 1, wherein a level of the first sensing signal is different from that of the second sensing signal when the flexible touch panel has a shape in which the flexible touch panel is bent along a first direction.

4. The display device of claim 1, wherein the flexible touch panel is a resistive touch panel.

5. The display device of claim 4, wherein the controller is further configured to compensate the image signal in black and white when the level of the first sensing signal is greater than that of the second sensing signal.

6. The display device of claim 1, wherein the controller is further configured to compensate the color temperature of the image signal so that the color temperature of the image signal is greater than the reference color temperature when the level of the first sensing signal is greater than that of the second sensing signal.

7. The display device of claim 1,
   wherein the flexible display panel lies on a first plane when the flexible display panel is flat and a viewpoint of a viewer lies on a second plane which is parallel with the first plane,
   wherein a distance between the center portion and the second plane is a first distance, a distance between the edge portion and the second plane is a second distance, and a color temperature of an image displayed on the flexible display panel when the first distance is substantially equal to the second distance is defined as a reference color temperature, and
   wherein the controller is further configured to compensate a color temperature of the image signal so that the color temperature of the image signal is less than the reference color temperature when the first distance is greater than the second distance.

8. The display device of claim 7, wherein the controller is further configured to compensate the color temperature of the image signal so that the color temperature of the image signal is greater than the reference color temperature when the first distance is less than the second distance.

9. The display device of claim 1, wherein the controller is further configured to compensate at least one of a color temperature and a gamma value of the image signal.

10. The display device of claim 1, wherein the controller comprises:
    a bending detector electrically connected to the flexible display panel and configured to: i) receive the sensing signals from the flexible display panel, ii) determine the bent shape based on, the received sensing signals, and iii) output a shape determination signal;
    a memory configured to store a compensation value;
    a compensator electrically connected to the memory and a data driver and configured to: i) read a compensation value corresponding to the shape determination signal from the memory ii) compensate the image signal with the compensation value so as to generate an image data signal and ii) output the image data signal to the data driver; and
    a signal driver electrically connected to the flexible display panel and configured to: i) convert the image data signal into the gradation signal and ii) provide the gradation signal to the flexible display panel.

11. The display device of claim 10,
    wherein the flexible display panel comprises a plurality of gate lines, a plurality of data lines, and a plurality of pixels respectively connected to the gate lines and the data lines, and
    wherein the signal driver comprises:
    a gate driver configured to drive the gate lines; and
    the data driver configured to: i) convert the image data signal into the gradation signal and ii) provide the gradation signal to the data lines.

12. A method of driving a display device comprising a flexible display panel and a flexible touch panel disposed on one surface of the flexible display panel, the method comprising:

receiving a first sensing signal corresponding to a center portion of the flexible touch panel and a second sensing signal corresponding to an edge portion of the flexible touch panel;

comparing the first and second sensing signal so as to determine a bent shape of the flexible touch panel;

compensating an input image signal based on the determined bent shape so as to generate an image data signal;

converting the image data signal into a gradation signal; and applying the gradation signal to the flexible display panel, wherein the flexible touch panel is a resistive touch panel and a color temperature of an image displayed on the flexible display panel when the first sensing signal is substantially the same as the second sensing signal is defined as a reference color temperature, and wherein the method further comprises compensating the color temperature of the image signal so that the color temperature of the image signal is less than the reference color temperature when a level of the first sensing signal is less than that of the second sensing signal.

13. The method of claim 12, wherein the generating the image data signal comprises:

reading a compensation value corresponding to the bent shape from a memory configuring to store a compensation value; and compensating the image signal using the compensation value.

14. The method of claim 12, wherein a level of the first sensing signal is different from that of the second sensing signal when the flexible touch panel has a shape in which the flexible touch panel is bent along a first direction.

15. The method of claim 12, further comprising compensating the color temperature of the image signal so as to be greater than the reference color temperature when the level of the first sensing signal is greater than the second sensing signal.

16. The method of claim 12, further comprising compensating at least one of a color temperature and a gamma value of the image signal so as to generate the image data signal.

17. A display device, comprising:

a flexible display panel;

a flexible touch panel disposed on one surface of the flexible display panel;

a detector electrically connected to the flexible display panel and configured to: i) receive a plurality of sensing signals from the flexible touch panel, ii) determine a bent shape of the flexible touch panel based on the sensing signals, and iii) output a shape determination signal based on the determined bent shape, wherein the sensing signals comprise a first sensing signal corresponding to a center portion of the flexible touch panel and a second sensing signal corresponding to an edge portion of the flexible touch panel;

a compensator electrically connected to a memory and a data driver and configured to: i) receive an input image signal and the shape determination signal ii) compensate the image signal based on the shape determination signal and iii) output the compensated image data signal to the data driver; and a signal driver electrically connected to the flexible display panel and configured to: i) convert the compensated image data signal into a gradation signal and ii) provide the gradation signal to the flexible display panel, wherein the signal driver comprises the data driver, wherein the flexible touch panel is a resistive touch panel and a color temperature of an image displayed on the flexible display panel when the first sensing signal is substantially the same as the second sensing signal is defined as a reference color temperature, and wherein the signal driver is further configured to compensate the color temperature of the image signal so that the color temperature of the image signal is less than the reference color temperature when a level of the first sensing signal is less than that of the second sensing signal.

* * * * *